United States Patent
Bazar et al.

(10) Patent No.: US 10,419,557 B2
(45) Date of Patent: Sep. 17, 2019

(54) IDENTIFYING AND MANAGING REDUNDANT DIGITAL CONTENT TRANSFERS

(71) Applicant: International Business Machines Corporation, Armonk, NY (US)

(72) Inventors: Sandeep Bazar, Warangal (IN); Sandeep R. Patil, Pune (IN); Sachin C. Punadikar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 15/075,264

(22) Filed: Mar. 21, 2016

(65) Prior Publication Data

US 2017/0272526 A1    Sep. 21, 2017

(51) Int. Cl.
*H04L 29/08* (2006.01)

(52) U.S. Cl.
CPC ............ *H04L 67/22* (2013.01); *H04L 67/327* (2013.01)

(58) Field of Classification Search
CPC ....... H04L 67/327; H04L 47/38; H04L 67/42; H04L 69/04; G06F 11/1464; G06F 11/1451
See application file for complete search history.

(56) References Cited

U.S. PATENT DOCUMENTS

| | | | |
|---|---|---|---|
| 7,617,178 B2 | 11/2009 | Chavez et al. | |
| 8,023,773 B2 | 9/2011 | Brunk et al. | |
| 8,488,836 B2 | 7/2013 | Brunk et al. | |
| 2007/0156726 A1* | 7/2007 | Levy | G06F 21/10 |
| 2007/0174059 A1 | 7/2007 | Rhoads et al. | |
| 2008/0005141 A1* | 1/2008 | Zheng | G06F 3/0608 |
| 2009/0089587 A1 | 4/2009 | Brunk et al. | |
| 2009/0164529 A1* | 6/2009 | McCain | G06F 11/1464 |
| 2013/0136125 A1* | 5/2013 | Jain | H04L 47/38 |
| | | | 370/392 |
| 2013/0198339 A1* | 8/2013 | Lee | H04L 67/06 |
| | | | 709/219 |
| 2014/0143647 A1 | 5/2014 | Reshadi et al. | |
| 2014/0201384 A1* | 7/2014 | Rhea | H04L 65/605 |
| | | | 709/231 |
| 2015/0156273 A1 | 6/2015 | Decasper et al. | |
| 2017/0272526 A1* | 9/2017 | Bazar | H04L 67/327 |

(Continued)

FOREIGN PATENT DOCUMENTS

| CN | 102571921 A | 7/2012 |
|---|---|---|
| EP | 2621142 A1 | 7/2013 |

OTHER PUBLICATIONS

Fingerprint (computing), Feb. 2, 2016, Wikipedia, pp. 1-4. (Year: 2016).*

(Continued)

*Primary Examiner* — Vivek Srivastava
*Assistant Examiner* — Muhammad Raza
(74) *Attorney, Agent, or Firm* — Daniel C. Housley (57) ABSTRACT

A computer system receives digital content for communication to a user. Digital fingerprints are calculated from the digital content. The fingerprints are compared to identify redundant digital content. Digital identifications associated with the digital fingerprints are communicated to a user device to determine whether the digital content exists in local storage.

12 Claims, 4 Drawing Sheets

(56) References Cited

U.S. PATENT DOCUMENTS

2018/0253251 A1* 9/2018 Hayasaka ............. G06F 3/0608

OTHER PUBLICATIONS

Fenlon, W., "How Digital Fingerprinting Works", HowStuffWorks, Copyright © 1998-2015 HowStuffWorks, a division of InfoSpace LLC, 4 pages. Last printed Jan. 6, 2016. http://computer.howstuffworks.com/digital-fingerprinting.htm.

Narang, N., "#3 Concept Series : What is Digital Fingerprinting", Media & Entertainment Industry Trends, Technology and Research, © 2010 CC BY 3.0, 5 pages. Last printed on Jan. 6, 2016. http://www.mediaentertainmentinfo.com/2013/06/3-concept-series-what-is-digital-fingerprinting.html/.

Unknown,"Digital video fingerprinting", Wikipedia, the free encyclopedia, 4 pages. Last printed on Jan. 6, 2016. https://en.wikipedia.org/wiki/Digital_video_fingerprinting.

* cited by examiner

IDENTIFYING AND MANAGING REDUNDANT DIGITAL CONTENT TRANSFERS

BACKGROUND

The present invention relates generally to the field of computing device resource conservation, and more particularly to identifying and managing redundant digital content transfers.

Digital content transfers frequently occur over a network. For example, users may share videos or music on a social media site, through a messaging service, e-mail, via a peer-to-peer application, etc.

SUMMARY

Disclosed herein are embodiments of a method for avoiding redundant communication of digital content. A computer system receives a first digital content for communication to a user. A first digital fingerprint is calculated from the first digital content. A determination is made that the first digital fingerprint matches a stored digital fingerprint associated with the user. A digital identification associated with the stored digital fingerprint is identified. The digital identification is communicated to a user device associated with the user to cause the user device to determine whether digital content associated with the digital identification exists in the user device's local storage.

Further disclosed herein are embodiments of a second method for avoiding redundant communication of digital content. A computer system receives a first digital content from a server. The first digital content is stored in local storage. The computer system receives, from a server, a first digital identification associated with a digital fingerprint of the first digital content. The first digital identification is stored, with data referencing the first digital content. The computer system receives a second digital identification from a server. In response to receiving the second digital identification, the computer system determines whether the second digital identification matches the first digital identification. In response to determining the second digital identification matches the first digital identification, the computer system identifies digital content associated with the first digital identification using the data referencing the first digital content. The computer system provides a notification to a user that the first digital content is available in local storage.

Further disclosed herein are embodiments of a system for avoiding redundant communication of digital content. A computer system comprising a memory with program instructions stored thereon and a processor in communication with the memory, wherein the computer system is configured to receive a first digital content for communication to a user. A first digital fingerprint is calculated from the first digital content. A determination is made that the first digital fingerprint matches a stored digital fingerprint associated with the user. A digital identification associated with the stored digital fingerprint is identified. The digital identification is communicated to a user device associated with the user to cause the user device to determine whether digital content associated with the digital identification exists in the user device's local storage.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate to computing device resource conservation, and more particularly, to identifying and managing redundant digital content transfers. While the present disclosure is not necessarily limited to such applications, various aspects of the disclosure may be appreciated through a discussion of various examples using this context.

Given the ubiquitous nature of networks where data usage is chargeable, conservation of client device resources and smart management of bandwidth is needed to keep costs low. Social media sites and messaging applications, for example, pose large obstacles in this area, because users are constantly sharing the same digital content with each other, with varying formats, resolutions, filenames, etc. When digital content is communicated to a client device, bandwidth, processor time and power, memory for storage, and other resources are consumed. Identifying and avoiding redundant downloads of digital content will preserve these resources and realize cost savings.

Hash value comparison is a technique that may be used to identify and compare digital content. This technique is limited because it can only determine absolute equality or non-equality of content files or parts of said files. Small differences in content, such as a difference in resolution, format, etc. may cause a hash value comparison to fail to detect similar or identical pieces of digital content.

Digital watermarking can also be used to identify similar or identical content. This technique focuses on inserting a signature or other identifying features into the content. While watermarks can be difficult to remove, the technique cannot identify similar or identical content in cases where the watermark has been successfully removed, damaged beyond utility, or in cases where the content was reproduced prior to the insertion of the watermark.

Unlike the aforementioned techniques, digital fingerprinting extracts and compresses characteristic components of digital content and creates a "fingerprint" that allows the content to be reliably compared and identified, regardless of variations in size, format, resolution, filename, time of reproduction, etc.

When digital content is "shared" over a network, there is an opportunity to conserve resources and avoid redundant communications by comparing the content's fingerprint to the fingerprints of previously-communicated content and having the client device access the redundant content already located in that device's local storage. For example, when a video is shared through a messaging application, a social media site, e-mail, etc. there is a chance a similar or identical video was previously shared with the user and already exists on the client device. Digital fingerprinting can be utilized to recognize this situation and avoid a redundant download of the video onto the client device, thus conserving bandwidth, storage, etc.

Figure 1:
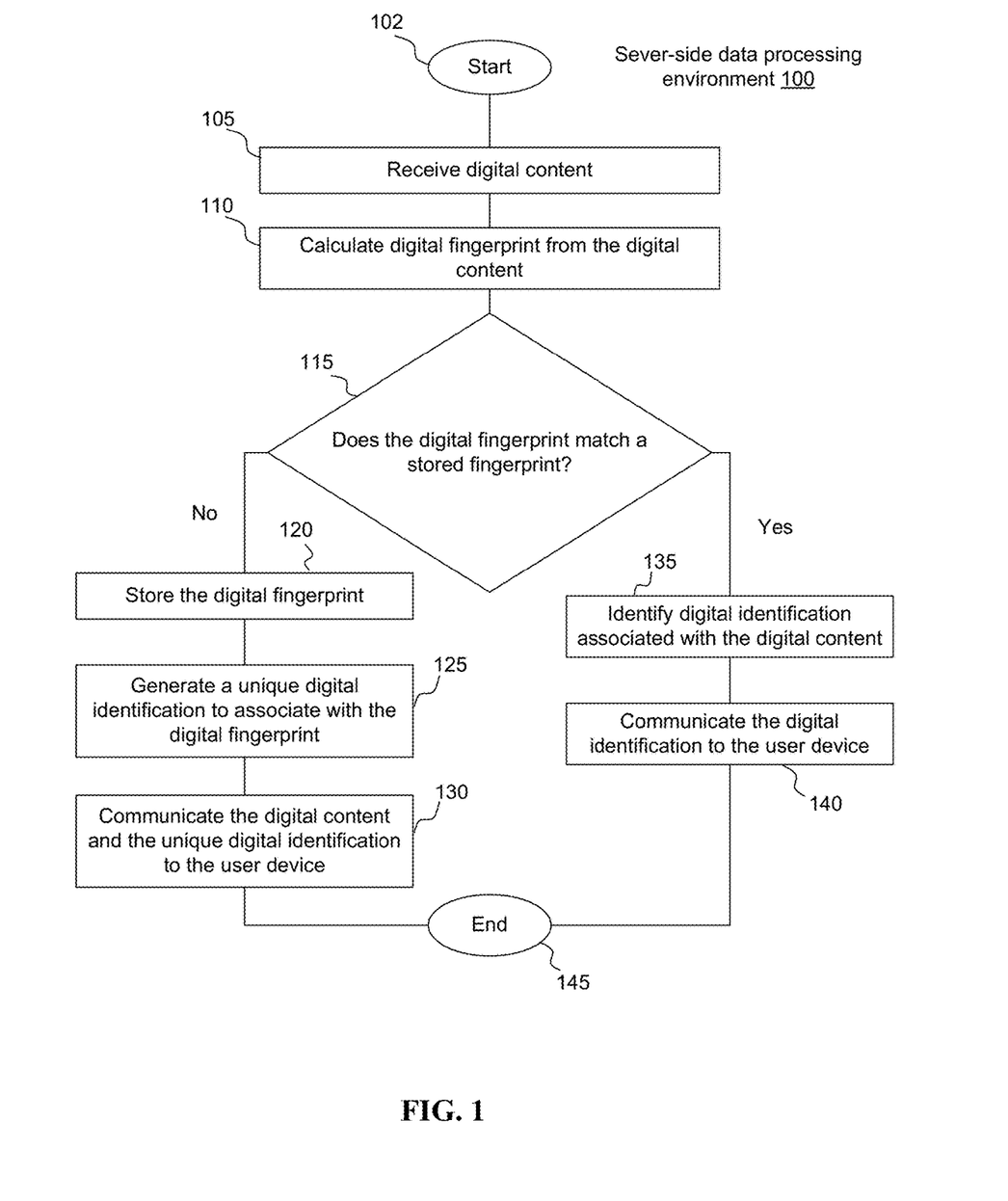
FIG. 1 illustrates a flow diagram of an example method, in a server environment, for avoiding the redundant communication of digital content.

The present invention will now be described in detail with reference to the Figures. FIG. 1 is a flow diagram of an example method for avoiding the redundant communication of digital content in a server-side data processing environment, generally designated 100, in accordance with embodiments of the present disclosure. From start 102, a piece of digital content is received at 105 for communication to a user. For example, a video file titled Video1.avi may be shared on a social media site with User1, causing Video1.avi to be received by a server for communication to User1.

A digital fingerprint is calculated from the digital content at 110. For example, software may be used to decode the file data and apply feature extraction algorithms. The fingerprint may be a string of values representing a variety of the content's properties (e.g. frame snippets, audio changes, brightness level, object movements, metadata entries, etc.) that are highly compressed compared to the original file (i.e. lossy compression), resulting in the creation of, for example, Fingerprint 4.

The fingerprint is compared against stored fingerprints at 115. The stored fingerprints may refer to a single fingerprint or a plurality of fingerprints. The fingerprints may be stored in a table or database, locally or remotely, relative to the server-side data processing environment. The stored fingerprints may be stored to provide a record of digital content previously communicated to a client device. The stored fingerprints may be referenced by user or group of users. For example, Fingerprint 4 may be compared against a table, such as Table 1 For User1, below:

TABLE 1

| For User1 | |
| --- | --- |
| Fingerprint | Digital Identification |
| Fingerprint 1 | ID1 |
| Fingerprint 2 | ID2 |
| Fingerprint 3 | ID3 |

If no matching fingerprint is found, the fingerprint is stored at 120. Fingerprints may be stored in a table or database. For example, the fingerprint may be stored in Table 1 For User1 or a database containing other digital fingerprints generated from digital content previously communicated to User1.

A unique digital identification is generated to associate with the digital fingerprint at 125. The unique digital identification may be generated by a variety of methods, such as random number generation, sequential numbering, or a reduced-bit representation of the digital fingerprint. For example, when the unique digital identification is generated and associated, Table 1 For User1 may be updated to resemble:

TABLE 1

| For User1 | |
| --- | --- |
| Fingerprint Designation | Digital Identification |
| Fingerprint 1 | ID1 |
| Fingerprint 2 | ID2 |
| Fingerprint 3 | ID3 |
| Fingerprint 4 | ID4 |

The digital identification and the digital content are communicated to the client device at 130. The digital content may be video, audio, photography, interactive media, etc. A user may share the content via messaging application, social media site, file hosting service, electronic mail, peer-to-peer application, etc. For example, Video1.avi and its associated unique digital identification, ID4, may be shared with, and communicated to, User1 via an instant messaging service.

If a matching fingerprint is found at 115, the unique digital identification assigned to the stored fingerprint is identified at 135. The digital identification may be located in a table or database, configured to associate the stored fingerprints with their respective identifications. For example, using the table above, if matching Fingerprint 4 is found, the associated digital identification ID4 is identified.

The digital identification is communicated to the client device at 140. Receiving the digital identification may cause the user device to ascertain whether the associated digital content is in local storage, e.g. a hard drive or memory card. Using the above example, ID4 would be communicated to User1. This may cause the user device to determine whether Video1.avi exists in local storage.

Figure 2:
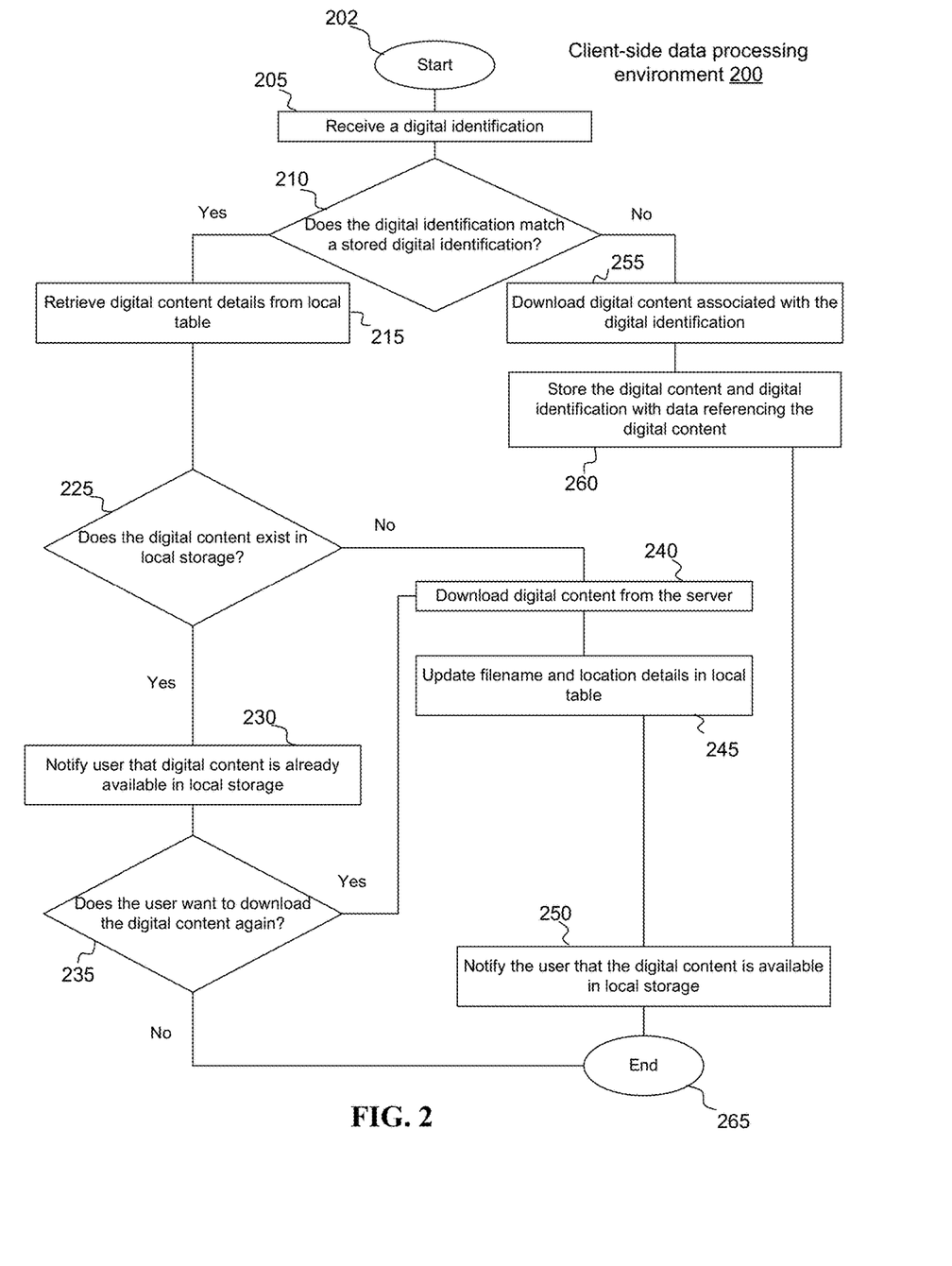
FIG. 2 illustrates a flow diagram of an example method, in a client environment, for avoiding the redundant communication of digital content.

FIG. 2 is a flow diagram of an example method for avoiding the redundant communication of digital content in a client-side data processing environment, generally designated 200, in accordance with embodiments of the present disclosure. From start 202, a digital identification is received from a server at 205. The identification may be received in response to the sharing of digital content, as described above. For example, the digital identification ID4 from the updated Table For User1 above may be received from a server in response to a server-side determination that User1 had previously received Video1.avi or another piece of digital content with an identical digital fingerprint.

The digital identification is compared against stored digital identifications at 210. The stored digital identifications may be stored in a table or database. The identifications may be stored to provide a record of digital content previously received by a client device. For example, ID4 may be compared against Table 2 For User1 below:

TABLE 2

| For User1 | |
| --- | --- |
| Digital Identification | Digital Content Details |
| ID1 | Audio1.wav, Location W |
| ID2 | Flash1.swf, Location X |
| ID3 | Video2.mpeg, Location Y |
| ID4 | Video1.avi, Location Z |

When a matching digital identification is found, the device retrieves the associated digital content's details from the local table or database at 215. The digital content details may include filename, location in storage, etc. For example, the match of ID4 causes the device to retrieve the associated digital content's details and determine whether Video1.avi exists at Location Z.

The device determines whether the digital content exists in local storage at 225. The device may use the details retrieved to check a location on a local hard drive, memory card, solid-state drive, etc. For example, if digital identification ID2's digital content details were retrieved, the device may determine whether Flash1.swf exists in local storage at Location X.

If the digital content exists in local storage, the device notifies the user at 230. The notification may be a window, message, sound, etc. For example, in response to a determination that Audio1.wav exists at Location W, the device may display a window, informing the user that the same or similar content is already in local storage.

The device may inquire whether the user wants to download the content again at 235. A user may wish to download a file with a higher resolution or alternate format. For example, the device may display a window informing the user of the differences in the two pieces of content (higher resolution, format differences, etc.) and give the user the option to cause the device to download the more recent copy of the digital content by clicking a button, inputting a voice command, etc.

If the user wants to download the more recent copy of the digital content at 235, the device downloads the digital content from the server at 240. The user may input the proper command to initiate the download. For example, if the user clicks the appropriate button to download the more recent copy of Video1.avi, the device may retrieve the content from the server and store it in Location A.

The device updates the digital content's details at 245. The device may access the table or database containing the digital content details and overwrite the data to reflect the more current information. For example, the device may update Table 2 For User1 to reflect the new location information, accordingly:

TABLE 2

For User1

| Digital Identification | Digital Content Details |
|---|---|
| ID1 | Audio1.wav, Location W |
| ID2 | Flash1.swf, Location X |
| ID3 | Video2.mpeg, Location Y |
| ID4 | Video1.avi, Location A |

The user device notifies the user that the digital content is available in local storage at 250. The notification may be a pop-up window, a text message, a sound, a vibration, etc. For example, the user device may display a pop-up window notifying the user that Video1.avi is now in local storage and ready for viewing.

If, at 235, the user declines to download the more recent copy of the digital content, the device accesses the digital content already in local storage. The user may decline to download the more recent content by clicking the appropriate button on a pop-up window, inputting a voice command, replying to a text message, etc. For example, the user may click a "No" button on a pop-up window to decline downloading the more recent copy of Video1.avi, causing the device to access the local copy of Video1.avi.

If, at 225, the device determines the digital content does not exist in local storage, the device downloads the digital content from the server at 240. The device may automatically request a download of the content and store it locally. For example, if the user has previously deleted Video1.avi, the device may automatically download Video1.avi from the server and store it in Location A of a local hard drive.

The device updates the stored digital identification details at 245. The device may update a table or database containing the details. For example, the digital content details in Table 2 For User1 may be updated to reflect accurate entries.

If, at 210, the device determines the digital identification does not match a stored digital identification, the device downloads the digital content at 255. The device may assume that no match means the digital content has never been received and proceed with a download. For example, if the digital identification ID4 does not match any stored digital identification, the device will download Video1.avi from the server.

The user device stores the digital content and digital identification, concatenate with data referencing the digital content at 260. The digital content may be stored on a hard drive, solid state, drive, memory card, etc. The digital identification and reference data may be stored in a table or database. For example, the user device may store Video1.avi on a memory card at Location Z, and update Table 2 For User1 for accuracy.

The user device notifies the user that the digital content is available in local storage at 250. The notification may be a pop-up window, text message, sound, vibration, etc. For example, the user device may display a text message notifying the user that Video1.avi is now in local storage and ready for viewing.

Figure 3:
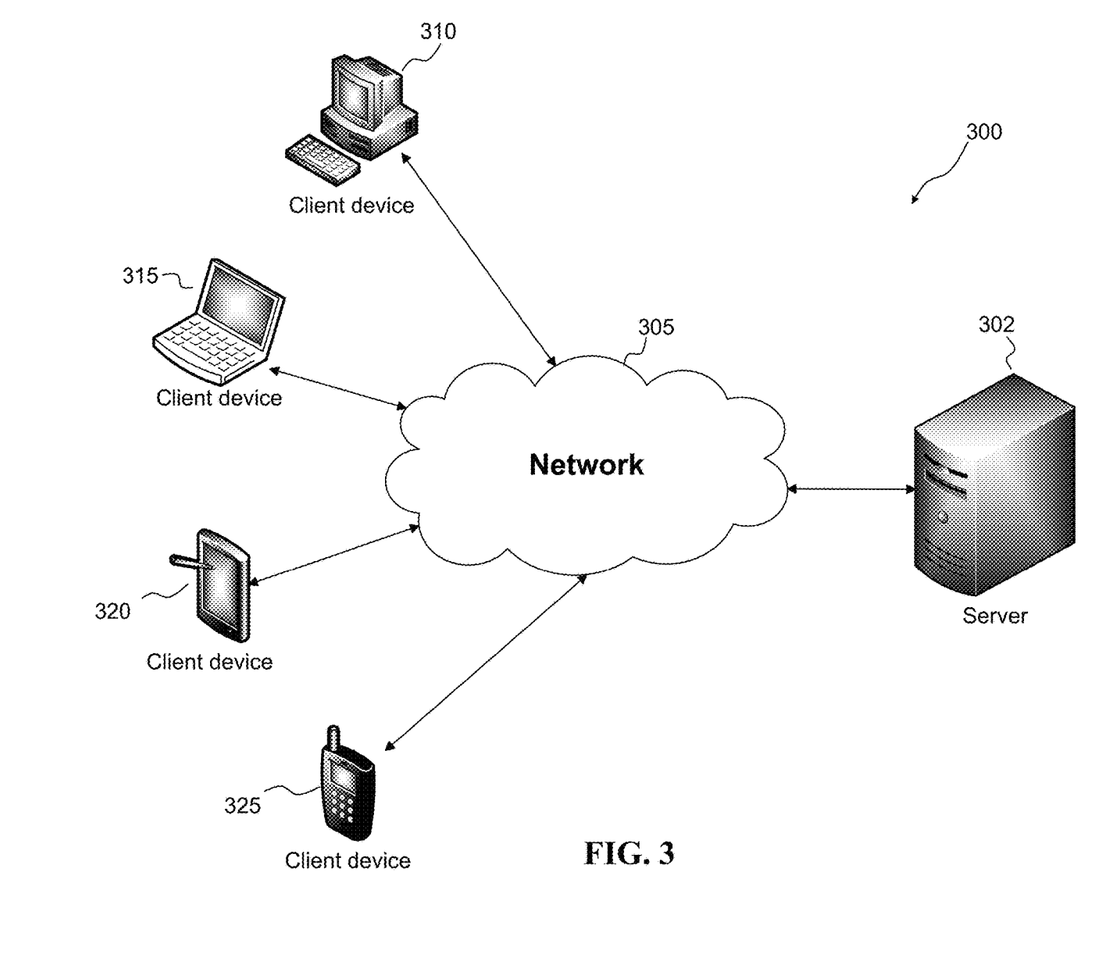
FIG. 3 illustrates a diagram of a network environment, in accordance with embodiments of the present disclosure.

FIG. 3 is a diagram illustrating an example system 300 for communication of digital content between a server 302 and client devices 310, 315, 320, and 325 over a network 305. In some embodiments, each client device may be under the control of a different user, or multiple client devices may be under the control of a single user. A client device may be a computing system, e.g. a desktop computer, a laptop computer, a tablet, a smartphone, a portable terminal, or one or more programs, devices, or combination thereof capable of processing digital content and configured to connect to a network and communicate with any number of servers or client devices.

Network 305 may be any type or combination of networks. For example, the network may include any combination of personal area network (PAN), local area network (LAN), metropolitan area network (MAN), wide area network (WAN), wireless local area network (WLAN), storage area network (SAN), enterprise private network (EPN), or virtual private network (VPN). In some embodiments, the network 305 may refer to an IP network, a conventional coaxial-based network, etc. For example, a server for an instant messaging application may communicate with various client devices (e.g. tablets, laptops, smartphones, portable terminals, etc.) over the Internet.

In some embodiments, the server 302 may refer to a computing system, e.g. one or more programs, devices, or combination thereof capable of processing digital content and configured to connect to a network and communicate with any number of client devices or servers. In some embodiments, the server 302 may be implemented in a cloud computing environment.

In some embodiments, the flow diagram of FIG. 1 may be performed by the server 302. The flow diagram of FIG. 2 may be performed by any number of client devices 310, 315, 320, and 325. The server and client(s) may communicate digital content (e.g. videos, music, interactive media files, etc.) and digital identifications, as well as requests for digital content and digital identifications over the network 305.

Figure 4:
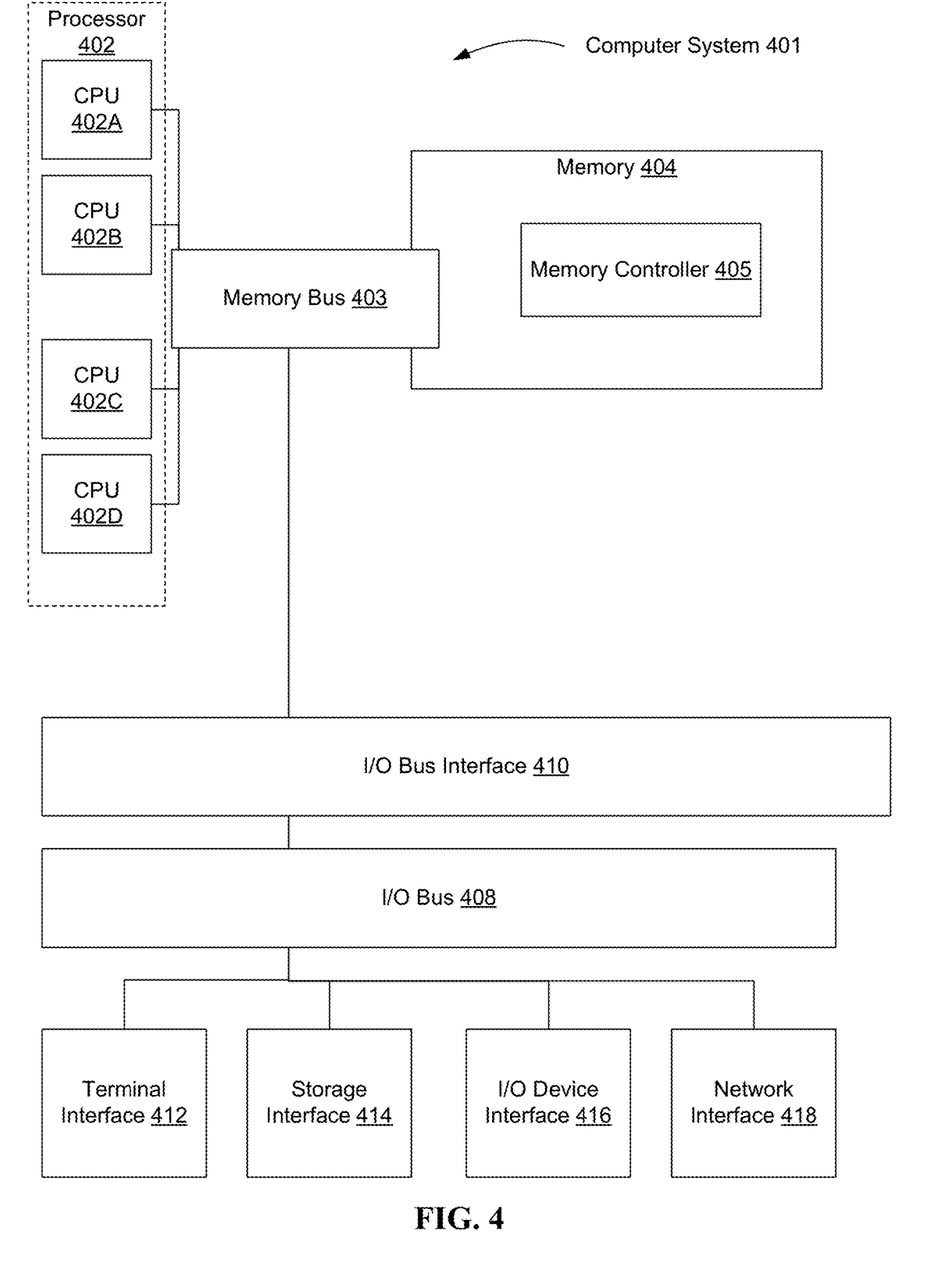
FIG. 4 illustrates a high-level block diagram of an example computer system that may be used in implementing embodiments of the present disclosure.

Referring now to FIG. 4, shown is a high-level block diagram of an example computer system (i.e., computer) 401 that may be configured to perform method 100, described in FIG. 1, or method 200, described in FIG. 2. The example computer system 401 may be used in implementing one or more of the methods or modules, and any related functions or operations, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may comprise one or more levels of on-board cache.

In some embodiments, the memory subsystem 404 may comprise a random-access semiconductor memory, storage device, or storage medium (either volatile or non-volatile) for storing data and programs. In some embodiments, the memory subsystem 404 may represent the entire virtual memory of the computer system 401, and may also include the virtual memory of other computer systems coupled to the computer system 401 or connected via a network. The memory subsystem 404 may be conceptually a single monolithic entity, but, in some embodiments, the memory subsystem 404 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 404 may contain elements for control and flow of memory used by the CPU 402. This may include a memory controller 405.

Although the memory bus 403 is shown in FIG. 4 as a single bus structure providing a direct communication path among the CPUs 402, the memory subsystem 404, and the I/O bus interface 410, the memory bus 403 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, mobile device, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

What is claimed is:

1. A computer-implemented method for avoiding redundant communication of digital content, the method comprising:

receiving a first digital content for communication to a user;

calculating a first digital fingerprint from the first digital content, wherein calculating the first digital fingerprint includes extracting and compressing a set of features from the first digital content, wherein the set of features includes frame snippets, audio changes, brightness level, object movements, and metadata entries;

determining the first digital fingerprint matches a stored digital fingerprint associated with the user, wherein the determining further comprises:

identifying a user fingerprint table for the user, the table comprising a plurality of stored digital fingerprints and associated digital identifications, the plurality of stored digital fingerprints being digital fingerprints of digital content previously communicated to the user; and determining the first digital fingerprint matches one of the plurality of stored digital fingerprints, and wherein the digital identification associated with the stored digital fingerprint is identified from the table;

identifying a digital identification associated with the stored digital fingerprint, the digital identification being stored in a table containing a plurality of digital identifications associated with a plurality of digital fingerprints, the digital identification having been generated using a random number generation algorithm, wherein the digital identification comprises a reduced-bit signature of the first digital fingerprint;

communicating the digital identification to a user device associated with the user to cause the user device to determine whether digital content associated with the digital identification exists in the user device's local storage;

receiving a second digital content for communication to a second user;

calculating a second digital fingerprint from the second digital content;

determining the second digital fingerprint does not match any stored fingerprint associated with the second user;

generating a unique digital identification to associate with the second digital fingerprint;

storing the second digital fingerprint with the unique digital identification; and communicating the second digital content and the unique digital identification to a user device associated with the user.

2. The method of claim 1, wherein the first digital content is a video file.

3. The method of claim 1, wherein the first digital content is an interactive media file.

4. The method of claim 1, wherein the receiving a first digital content for communication to a user occurs in response to a sharing of the first digital content via a messaging application.

5. The method of claim 1, wherein the receiving a first digital content for communication to a user occurs in response to a sharing of the first digital content via a social media site.

6. The method of claim 1, wherein the receiving a first digital content for communication to a user occurs in response to a sharing of the first digital content via a file hosting service.

7. The method of claim 1, wherein the receiving a first digital content for communication to a user occurs in response to a sharing of the first digital content via electronic mail.

8. The method of claim 1, wherein the user device is a smart phone.

9. The method of claim 1, wherein the user device is a tablet.

10. The method of claim 1, wherein the user device is a laptop computer.

11. The method of claim 1, wherein the user device is a portable terminal.

12. A system for avoiding redundant communication of digital content, the system comprising:
a memory with program instructions stored thereon; and
a processor in communication with the memory, wherein the system is configured to perform a method, the method comprising:
receiving a first digital content for communication to a user;
calculating a first digital fingerprint from the first digital content, wherein
calculating the first digital fingerprint includes extracting and compressing a set of features from the first digital content, wherein the set of features includes frame snippets, audio changes, brightness level, object movements, and metadata entries;
determining the first digital fingerprint matches a stored digital fingerprint associated with the user, wherein the determining further comprises:
identifying a user fingerprint table for the user, the table comprising a plurality of stored digital fingerprints and associated digital identifications, the plurality of stored digital fingerprints being digital fingerprints of digital content previously communicated to the user; and
determining the first digital fingerprint matches one of the plurality of stored digital fingerprints, and wherein the digital identification associated with the stored digital fingerprint is identified from the table;
identifying a digital identification associated with the stored digital fingerprint, the digital identification being stored in a table containing a plurality of digital identifications associated with a plurality of digital fingerprints, the digital identification having been generated using a random number generation algorithm, wherein the digital identification comprises a reduced-bit signature of the first digital fingerprint;
communicating the digital identification to a user device associated with the user to cause the user device to determine whether digital content associated with the digital identification exists in the user device's local storage;
receiving a second digital content for communication to a second user;
calculating a second digital fingerprint from the second digital content;
determining the second digital fingerprint does not match any stored fingerprint associated with the second user;
generating a unique digital identification to associate with the second digital fingerprint;
storing the second digital fingerprint with the unique digital identification; and
communicating the second digital content and the unique digital identification to a user device associated with the user.

* * * * *